(12) United States Patent
Pu

(10) Patent No.: US 6,603,894 B1
(45) Date of Patent: Aug. 5, 2003

(54) MEMS MIRROR ARRAYS AND EXTERNAL LENS SYSTEM IN AN OPTICAL SWITCH

(75) Inventor: Chuan Pu, Middletown, NJ (US)

(73) Assignee: Tellium, Inc., Oceanport, NJ (US)

( * ) Notice: Subject to any disclaimer, the term of this patent is extended or adjusted under 35 U.S.C. 154(b) by 0 days.

(21) Appl. No.: 09/769,481

(22) Filed: Jan. 26, 2001

(51) Int. Cl.[7] ............................. G02B 6/26; G02B 6/42
(52) U.S. Cl. ........................... 385/18; 385/17; 385/19; 359/223; 359/224
(58) Field of Search ............................. 385/16–23, 31; 359/290, 291, 292

(56) References Cited

U.S. PATENT DOCUMENTS

| | | | | |
|---|---|---|---|---|
| 5,953,151 A | * | 9/1999 | Hewlett | 359/290 |
| 6,028,690 A | * | 2/2000 | Carter et al. | 359/224 |
| 6,253,001 B1 | * | 6/2001 | Hoen | 385/17 |
| 6,268,952 B1 | * | 7/2001 | Godil et al. | 359/247 |
| 6,300,665 B1 | * | 10/2001 | Peeters et al. | 257/415 |
| 6,330,102 B1 | * | 12/2001 | Daneman et al. | 359/290 |
| 6,337,760 B1 | * | 1/2002 | Huibers et al. | 359/291 |
| 6,424,756 B1 | * | 7/2002 | Kalman et al. | 385/16 |
| 6,430,328 B1 | * | 8/2002 | Culver et al. | 385/16 |

OTHER PUBLICATIONS

D.T. Neilson et al., Fully Provisioned 112×112 Micro–Mechanical Optical Crossconnect With 35.8Tb/s Demonstrated Capacity, paper PD12–1, Optical Fiber Conference 2000, Baltimore MD, Mar. 7–10, 2000, IEEE Communications Society, IEEE Lasers and Electro–Optics Society, Optical Society of America.

* cited by examiner

*Primary Examiner*—Hemang Sanghavi
*Assistant Examiner*—Scott A Knauss
(74) *Attorney, Agent, or Firm*—Jeffery J. Brosemer

(57) ABSTRACT

An optical network element using arrays of mirrors in an optical switch. A lens system is placed in between the mirror arrays and optical signals are passed through the lens system in an off-axis manner in order to increase switching capacity so that larger arrays of mirrors can be used, shorten the optical path through the switch or a combination of both.

2 Claims, 12 Drawing Sheets

MEMS MIRROR ARRAYS AND EXTERNAL LENS SYSTEM IN AN OPTICAL SWITCH

BACKGROUND OF THE INVENTION

1. Field of the Invention

The present invention relates to an optical fiber based communications network, and more particularly to an optical switch arrangement that provides increased use of the deflection angle capability for each mirror in an array of optical switching mirrors.

2. Discussion of the Related Art

In recent years, internet usage and other computer communications modes have become widespread. Moreover, audio and video applications that are becoming increasingly popular require large amounts of information (bandwidth) to be transferred. As a result, demands on the bandwidth supported by communications systems have skyrocketed. Optical communication systems have become increasingly important to fulfill such needs.

Such optical communications systems are capable of rapidly transferring large volumes of information by converting electrical signals into light signals and transmitting the light through optical fibers. The optical fibers form a network of optical paths between different geographic locations (e.g., different metropolitan areas). To route the information between the different locations, the information is switched between different optical paths. Conventionally, the information is switched by converting the optical signals into electrical signals, switching the electrical signals, reconverting the electrical signals to optical signals and re-transmitting the optical signals onto the desired optical path.

With advances in optical communications technology, optical switches (such as micro-mirror switches) are being developed to provide large switching fabrics that operate in the optical domain and can switch more information faster than electrical switches. Input and output coupling may be achieved by aligning an optical fiber, a collimating lens arrangement, and the mirror chip at both the inputs and the outputs.

Moreover, applications involving long distance optical paths at high bit rates (>Gbs) require the use of optical fibers requiring having tight fabrication tolerances to avoid optical loss if strict angular tolerances (within 0.01 degrees) are not achieved. In addition, such optical fibers have a small core diameter and a small numerical aperture. The small numerical aperture implies that the cone of light that can be accepted by the optical fiber is narrow. Hence, for reasons such as these, through-put is easily decreased if the light is not properly focused or if the light is diminished in intensity, thereby potentially causing signal loss or signal deterioration.

To successfully operate optical switches, the mirrors must be precisely aligned and the distance between mirrors reflecting a beam to connect fibers should be minimized. If the angular position of the steerable mirrors is off and/or if the mirrors are too far apart, some or all of the light from the input fiber will not reach the selected output fiber. There remains a need in the art for an optical switch having a compact and reliable arrangement of steerable mirrors.

SUMMARY OF THE INVENTION

Accordingly, the present invention is directed to an optical switch that substantially obviates one or more of the problems due to limitations and disadvantages of the related art.

An objective of the present invention is to provide increased use of the full deflection angle capability for each mirror in an array of optical switching mirrors.

Another objective of the present invention is to reduce optical losses by shortening the distance between the inputs and the outputs of an optical switch.

Another objective of the present invention is to reduce optical losses by focusing reflected signals between mirrors to minimize beam spreading caused by diffraction.

Another objective of the present invention is to reduce optical losses caused by aberrations in a lens system positioned between mirror arrays in an optical switch.

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical switch includes a first mirror array; a second mirror array; optical inputs substantially aligned with the first mirror array; optical outputs substantially aligned with the second mirror array; a lens system positioned between the first and second mirror arrays; and wherein the second mirror array is located substantially along a focal plane of the lens system Another aspect is an optical switch including a lens system having a first side, a second side and a centerline going through a central portion of the first and second side; a first mirror array positioned on the first side of the lens system; a second mirror array having a centerline and positioned on the second side of the lens system; optical outputs aligned with the second mirror array; optical inputs positioned on the first side of the lens system and aligned with the first mirror array; and wherein the centerline of the second mirror array and the centerline of the lens system are on the same axis.

Another aspect is an optical switch including a a lens system having a first side and a second side; a first mirror array positioned on the first side of the lens system; a second mirror array positioned on the second side of the lens system along a focal plane of the lens system and substantially perpendicular to an optical axis of the lens system; and a third mirror array positioned on the first side of the lens.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
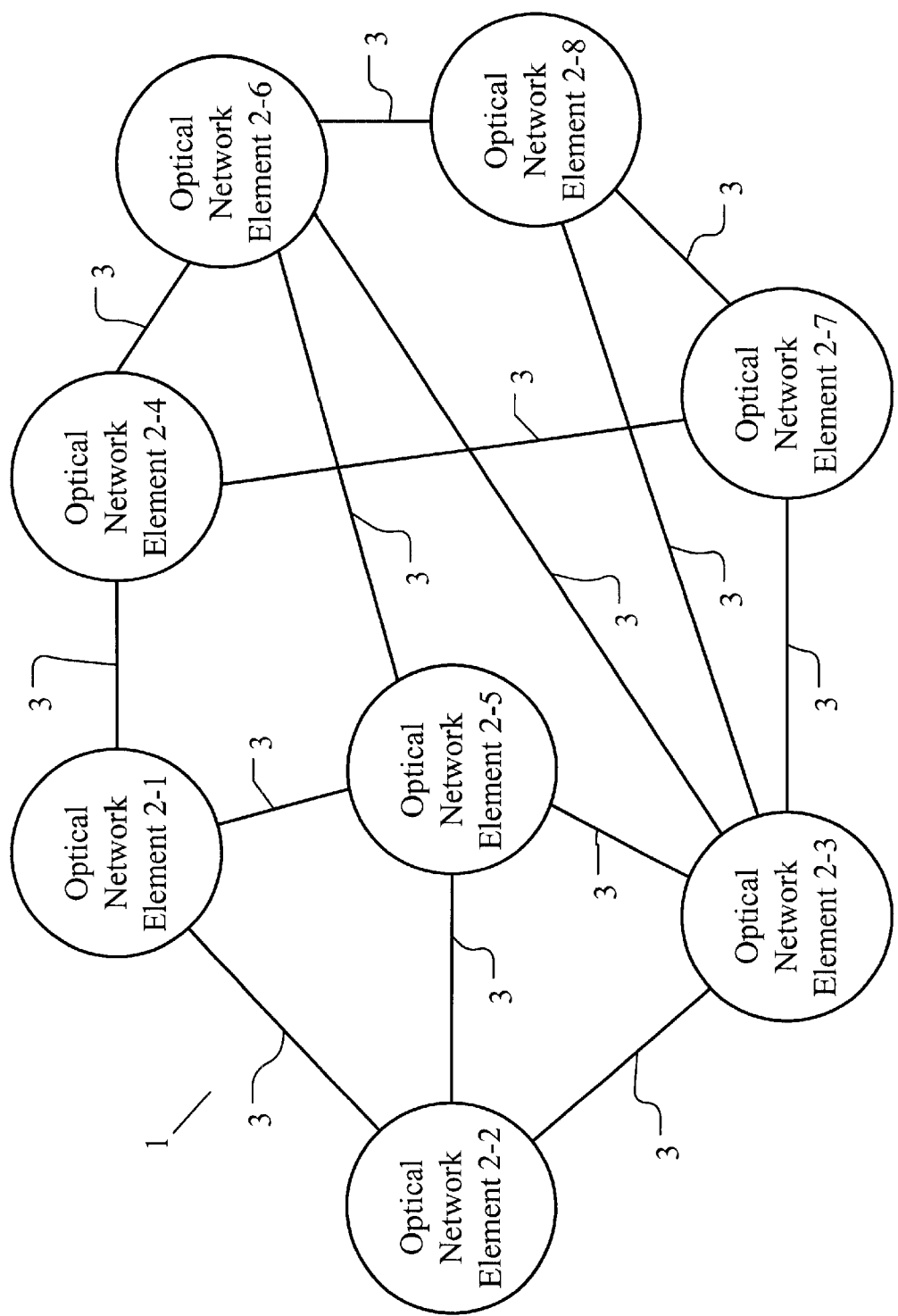
FIG. 1 illustrates an example of an optical mesh communications network that includes an optical switch in accordance with the present invention.

The present invention is particularly useful in optical switches for optical telecommunications network systems that carry optical communications signals, such as wavelength division multiplexed (WDM) signals, over optical fibers. FIG. 1 illustrates an exemplary embodiment of an optical mesh communications network 1. While FIG. 1 illustrates an optical mesh network, the present invention may be used in connection with other optical network architectures, such as ring, chains, and stars, among others, as well as other optical applications. As shown, the network 1 is made up of optical network elements 2-1 to 2-8 interconnected through optical links 3 in a mesh pattern. Of course, the number of optical network elements 2 and interconnections shown in FIG. 1 is intended as an example only. It should be clear that the present invention is applicable with different numbers and/or interconnections of network elements 2. The optical links 3 are shown generally and may encompass different numbers of optical paths and different physical paths between the network elements 2.

In general, the optical network elements 2 communicate information signals to other optical network elements through the optical links 3. The optical network elements 2 may include optical cross-connects, add-drop multiplexers, or other switching equipment to allow the signals carried on the optical links 3 to be transmitted through the network elements 2, as necessary, from source to destination. In addition, and not shown in FIG. 1, the optical network elements 2 may be connected to information sources (ingresses) and destinations (egresses) in the locality of that optical network element 2. Thus, information signals may enter the optical mesh network 1 at a local connection to network element 2-2. The information signals may be converted to optical signals, if they are not already, and then travel in the optical network 1 from network element 2-2, through network elements 2-3 and 2-7, and to network element 2-8, where it is passed to a destination in the locality of network element 2-8.

Figure 2:
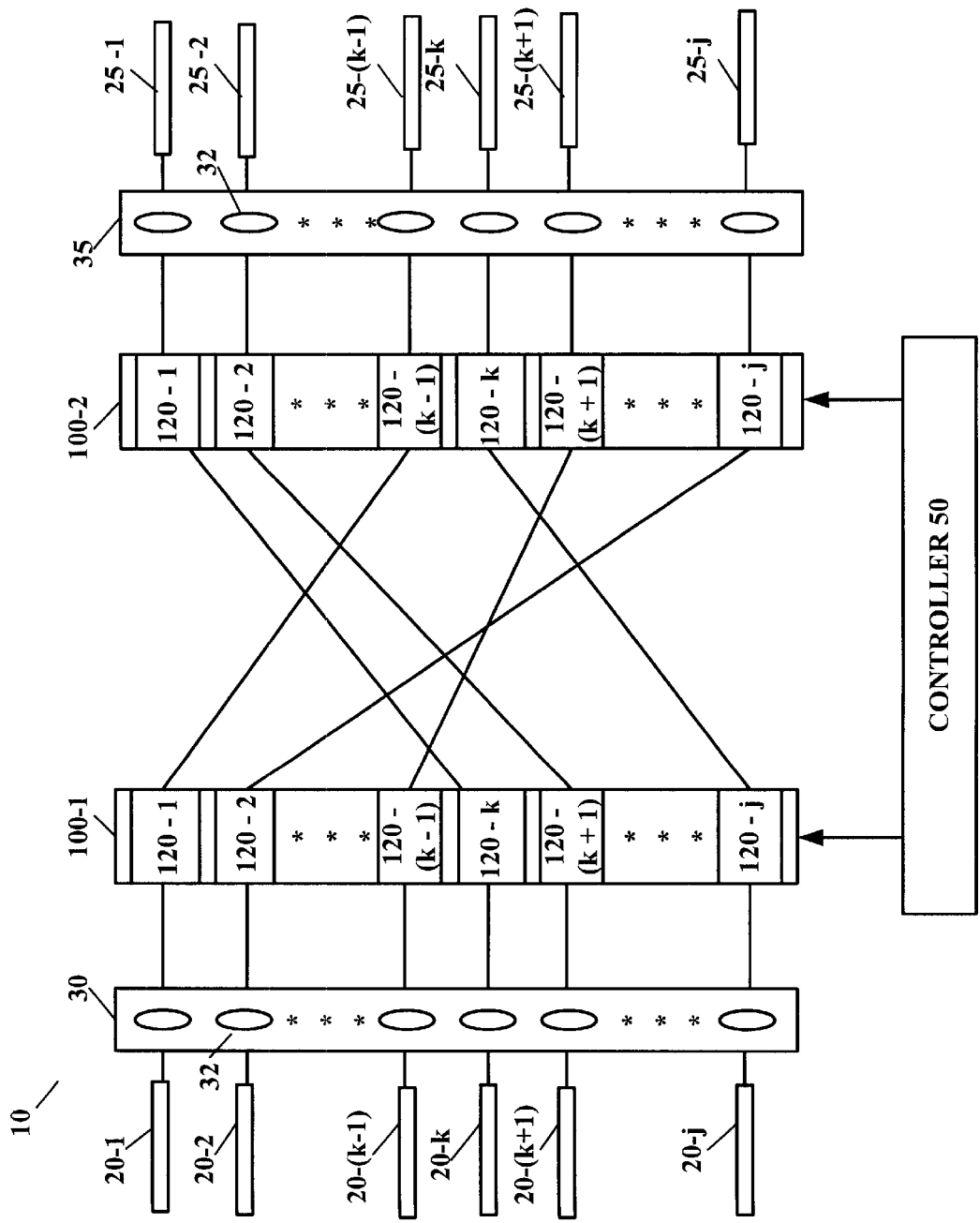
FIG. 2 provides a schematic of an illustrative optical switch design that includes an optical switch in accordance with the present invention.

FIG. 2 illustrates a schematic of an optical switch 10 that may be used in network elements. The optical switch 10 according to the present invention may be configured as an optical cross connect (OXC), an add-drop multiplexer (ADM), or another optical switch arrangement.

The optical switch 10 switches optical signals from a plurality of input optical fibers 20-1 to 20-j (collectively "input optical fibers 20") to selected output fibers 25-1 to 25-j (collectively "output optical fibers 25"). The input optical fibers 20 and output optical fibers 25 may be arranged in any way, for example a k x j/k rectangular array, such as a square array. The types of the optical signals carried by the input optical fibers 20 and output optical fibers 25 do not limit the present invention. Each optical input fiber 20 may carry WDM signals, a single wavelength optical signal that was demultiplexed from a WDM signal by a wavelength division demultiplexer, or other types of optical signals, such as CATV signals. Similarly, each optical output fiber 25 may carry WDM signals, single wavelength optical signal to be multiplexed with other optical signals by a wavelength division multiplexer, or other types of optical signals. The optical signals typically carry information and may have wavelengths of about 1300–1500 nm, for example. While FIG. 2 shows a schematic of an embodiment with j input optical fibers 20 and j output optical fibers 25, the number of input optical fibers may differ from the number of output optical fibers. The input and output optical fibers might be single mode or multimode.

The input optical fibers 20 carry optical signals that are supplied, respectively, to a lens arrangement 30. The lens arrangement 30 may include a plurality of lenses 32 arranged in an array. The lenses 32 are preferably arranged so that each input optical fiber 20 is aligned with a lens 32. Alternatively, microlenses 32 may be integrated with the ends of the input optical fibers 20. In this way, optical signals emitted from an input fiber 20 will pass through one of the lenses 32. The lenses 32 direct optical beams from the input optical fibers 20 to a first arrangement of mirrors 100-1, which will be described in greater detail below.

The first mirror arrangement 100-1 includes a plurality of steerable mirror units 120. The mirrors 122 may be arranged in a planar array or nonplanar array. Each input optical fiber 30 corresponds to one lens 32 of the first lens arrangement 30 and one mirror unit 120 of the first mirror arrangement 100-1. Using the mirror units 120 and responsive to control signals, the first mirror array 100-1 couples the optical beams from the lens array 30 to selected steerable mirror units 120 of a second array of mirrors 100-2. The second mirror array 100-2 includes mirror units 120 that may be arranged on a planar or nonplanar substrate. The second mirror array 100-2 need not match the first mirror array 100-1 in terms of being a planar array, a nonplanar array, the number of mirrors, the shape of the mirrors or the size of the mirrors.

Each mirror unit 120 of the first array 100-1 is preferably steerable to permit an input beam to be reflected by the mirror unit 120 to any mirror unit 120 of the second array 100-2. The mirror units 120 of the second array 100-2, also responsive to control signals, receive and couple the optical beams through a second lens array 35 to output fibers 25. The second lens array 35 includes lenses 32, which may be arranged in an array, aligned with output optical fibers 25. Alternatively, microlenses 32 may be integrated with the ends of the output optical fibers 25. Lenses 32 direct the optical beams into output optical fibers 25. Accordingly, optical signals carried on input optical fibers 20 may be selectively coupled to output optical fibers 25.

The mirror arrays 100-1 and 100-2 can be controlled to redirect or switch the coupling of optical signals. For example, as shown in FIG. 2, steerable mirror unit 120-1 of array 100-1 directs an optical signal to steerable mirror unit 120-(k-1) of array 100-2. However, responsive to control signals, steerable mirror unit 120-1 of array 100-1 may redirect the optical signal it receives from input optical fiber 20-1 to steerable mirror unit 120-2 of array 100-2. Mirror unit 120-2 may be controlled to receive the optical signal and provide it to optical fiber 25-2.

While FIG. 2 shows a dual stage switching arrangement, one or more additional stages of mirror arrays may be interposed between mirror arrays 100-1 and 100-2 to form a multi-stage switching arrangement. Furthermore, a mirror switching arrangement may contain two or more mirror arrays in which a mirror array nearest an input can direct the input beam to one or more other mirror arrays nearest an output. Such an arrangement can also be accomplished with a mirror switching arrangement in which mirror array(s) nearest the input are arranged on a nonplanar convex (or concave) substrate and the other mirror arrays nearest an output are on a nonplanar concave (or convex) substrate.

Figure 3:
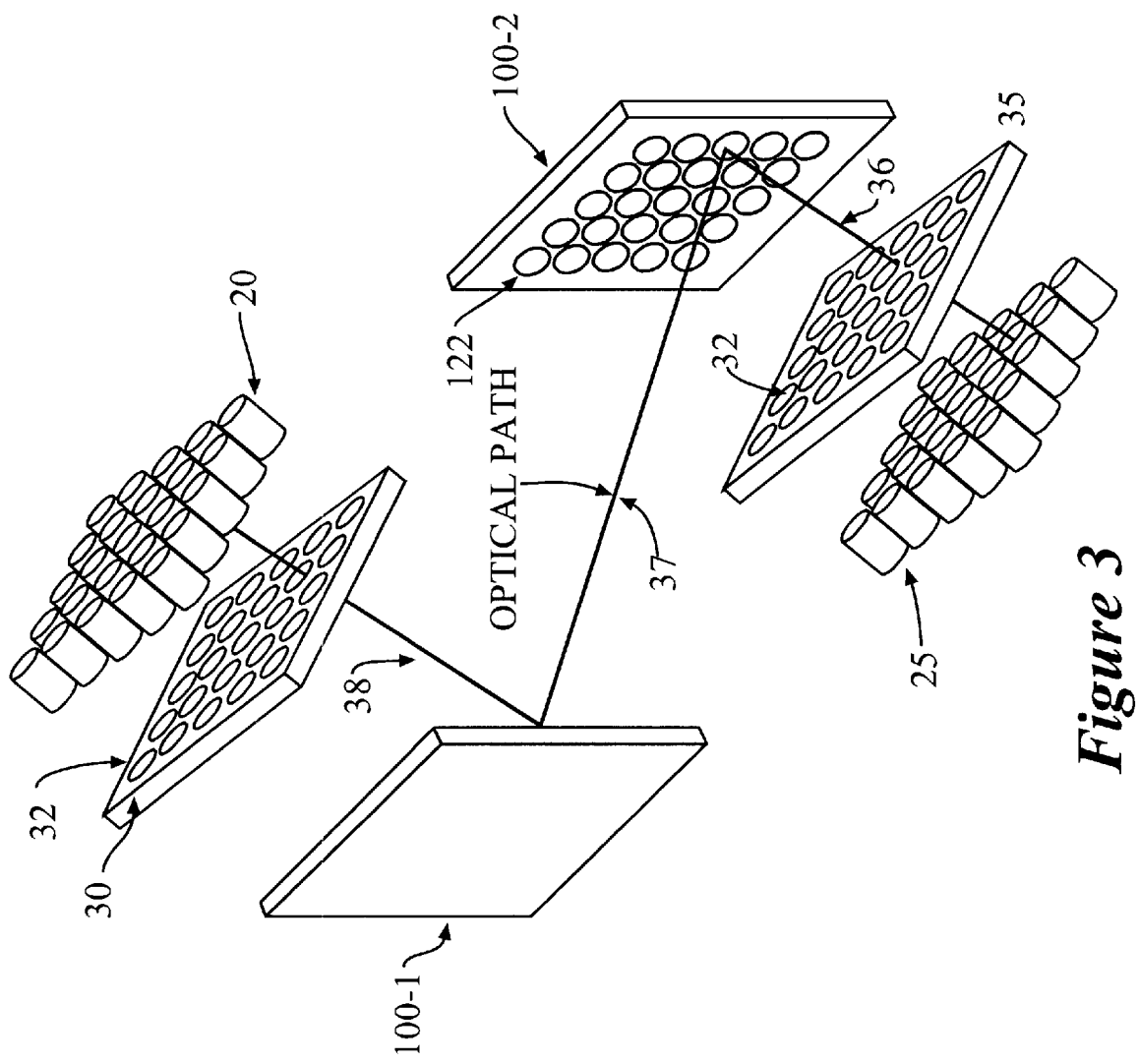
FIG. 3 illustrates an exemplary optical switch design using mirror arrays.

FIG. 3 shows an example of an optical switch 10 according to the schematic of FIG. 2. As shown in FIG. 2, the input optical fibers 20 and the output optical fibers 25 are arranged in two-dimensional arrays. Similarly, lens arrangements 30 and 35 include lenses 32 arranged in arrays and aligned with the input optical fibers 20 and the output optical fibers 25, respectively. The lens arrangement 30, 35 also include detectors 33 aligned with the lenses 32 on the opposite sides of the substrates of the lens arrangements. The mirror units 120 of the first and second arrays 100-1, 100-2 are formed of microelectromechanical system (MEMS) elements. The first array 100-1 is positioned at an angle to lens array 30 and generally faces the second array 100-2 with a distance between the two arrays. The second array 100-2 is positioned at an angle to the second lens array 35. Accordingly, an optical path 36/37/38 from an input fiber to an output fiber traverses a generally "Z-shaped" optical path, as illustrated in FIG. 3. However, different optical path shapes may also be implemented with other input/output and mirror array arrangements.

As shown in FIG. 3 with a single optical beam, the first lens array 30 receives the input optical beam from the input optical fibers 20 at a lens 32 and directs the input beam to a steerable mirror unit 120 of the first array 100-1. Depending on the angular position of the steerable mirror 122, the input optical beam is reflected to a selected steerable mirror unit 120 of the second array 100-2. The steerable mirror unit 120 of the second array 100-2 reflects the input optical beam through a lens 32 of the second lens array 35 to a selected one of the output optical fibers 25. Thus, the optical beam passes out of the input optical fiber, passes through a lens 32 of the first lens array 30, is reflected by mirrors in the first and second arrays 100-1, 100-2, passes through a lens 32 of the second lens array 30, and is directed into a selected output optical fiber 25.

Figure 4A:
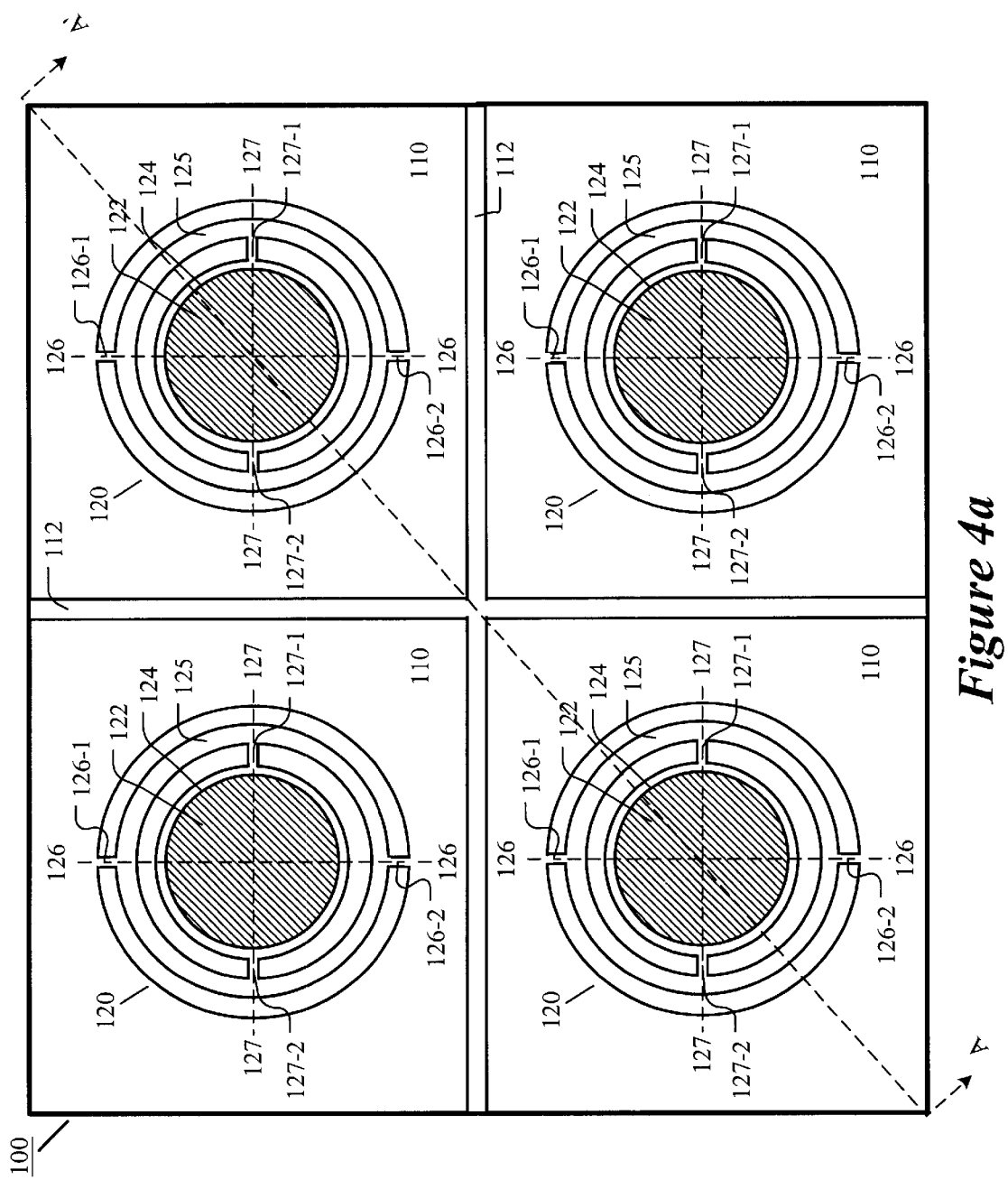
FIGS. 4a and 4b are respectively plan and cross-sectional views of an exemplary single gimbal microelectromechanical system ("MEMS") in accordance with the present invention.
Figure 4B:
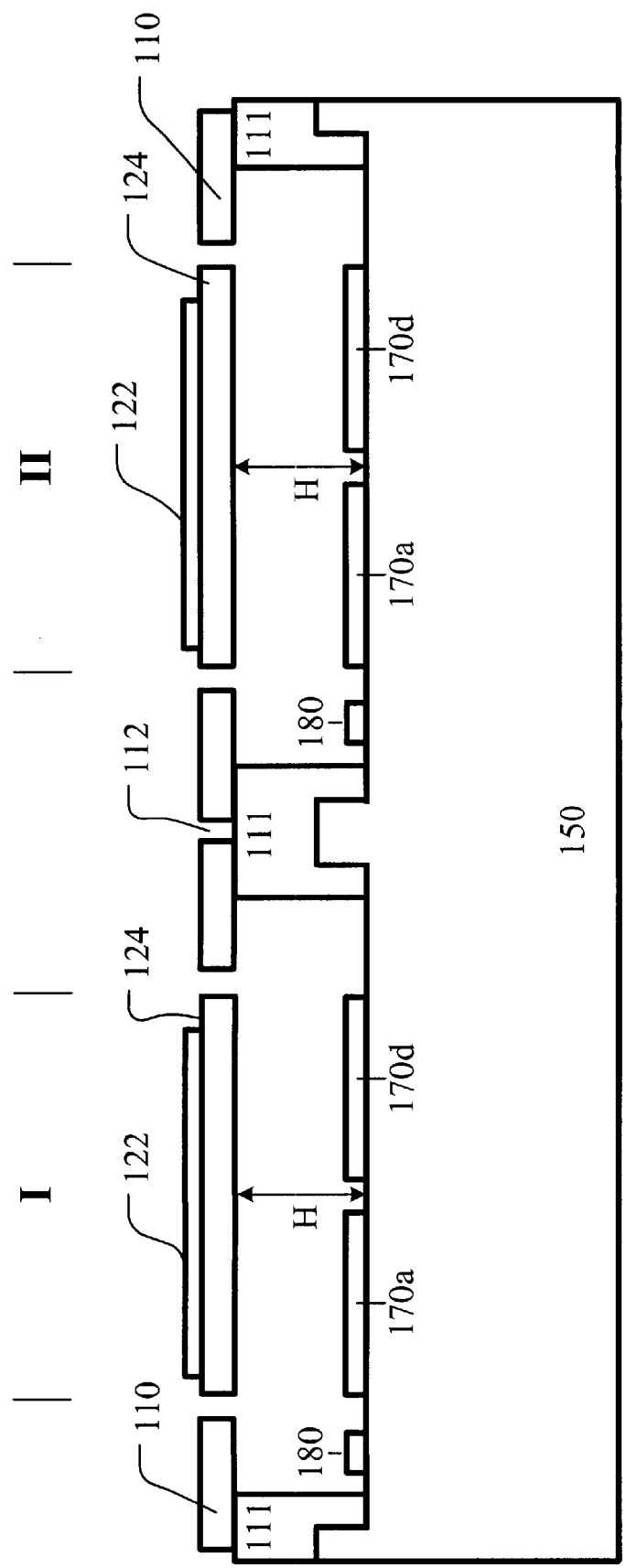

FIGS. 4a and 4b respectively illustrate plan and cross-sectional views of a portion of an exemplary mirror array 100. FIG. 4b represents a cross-section of the mirror arrangement 100 of FIG. 4a taken along an axis A–A'. As should be apparent, FIGS. 4a and 4b provide simplified illustrations of mirror arrangement 100 for purposes of explanation. Of course, other mirror or other mirror array structures may be used consistent with the present invention.

As shown in FIG. 4a, the mirror arrangement 100 may be formed using MEMS technology. The arrangement 100 includes a plurality of actuation substrates 110 in an array, which may be formed, for example, of single crystalline silicon on which a mirror unit 120 is formed. More particularly, the actuation substrate 110 includes a mirror 122 and a corresponding mirror mount 124 for mounting the mirror 122. The mirrors 122 may be formed with a gold coating, for example, to provide a reflective surface. It should be understood, however, that the mirror 122 may be formed of any material that is reflective. Preferably, the mirror is formed of a material that is both reflective and conductive. Each mirror unit 120 on its corresponding actuation substrate is isolated from other mirror units 120 by an isolation trench 112. The trench 112 can be open or filled with insulating material. FIG. 4a shows four steerable mirror units 120 for purposes of illustration. Of course, the mirror arrangement 100 may have more or fewer than four steerable mirror units 120.

In particular, the mirror mount 124 includes a mounting arm 125 coupled to the actuation substrate 110 by pivot arms 126-1, 126-2 and coupled to the mirror 122 by pivot arms 127-1, 127-2. Pivot arms 126-1 and 126-2 enable the mounting arm 125, and thus the mirror 122, to pivot with respect to the planar substrate 300 about a first axis 126. Pivot arms 127-1 and 127-2 enable the mirror 122 to pivot with respect to the mounting arm 125 about a second axis 127, which is orthogonal to the first axis 126. The pivot arms may be single crystal silicon serpentine springs or other elastic/pivoting devices. Electrostatic or electromagnetic forces on the mirror 122 from electrodes 170 on the substrate 150 below the mirror 122 cause the pivoting action. Each mirror 122 with its corresponding mirror mount 124, mounting arm 125 and pivot arms 126-1/126-2/127-1/127-2 form a steerable mirror unit 120.

As shown in FIG. 4b, the actuation substrates 110, in which each includes a mirror unit 120, are mounted on a spacer 111 that separates the substrate 150 from the actuation substrates 110. The substrate 150 can be silicon, ceramic, epoxy, polyimide or other like materials. The spacer 111 can be silicon, ceramic, epoxy, polyimide or other like materials. In addition, the spacer can be omitted and mesa-like extensions of the substrate 150 can be used to support the actuation substrates 110. The substrate 150 includes a plurality of electrodes 170 arranged in groups corresponding to the steerable-mirror units 120 and, in particular, to the mirror 122 and mirror mount 124 of the steerable mirrors 120. Electrodes 170 act on the mirror 122 to control the angular position of the mirror 122 by electrostatic or electromagnetic force using the integrated control system 180 positioned adjacent and connected to the electrodes 170. Of course, the integrated control system can be placed elsewhere and use a multiplexer to control several mirrors. In addition to acting on the mirror 122, if the mirror mount 125 is conductive, the electrodes 170 can also act on the mirror mount 125 to control the angular position of the mirror 122 by electrostatic or electromagnetic force using the Integrated Control System 180 attached to the electrodes 170.

Figure 4C:
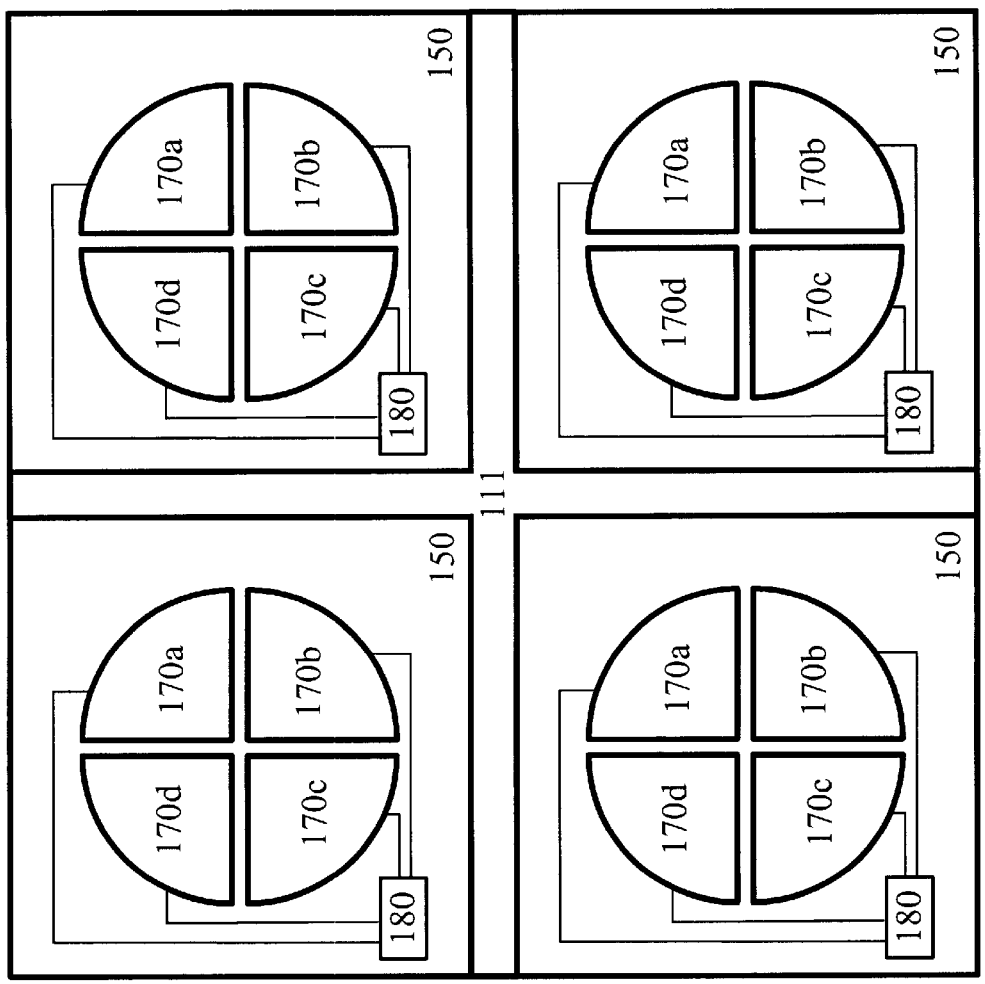
FIG. 4c is a cut-away plan-view of FIG. 4a of an exemplary arrangement of control electrodes in a MEMS mirror system according to the present invention.
Figure 4D:
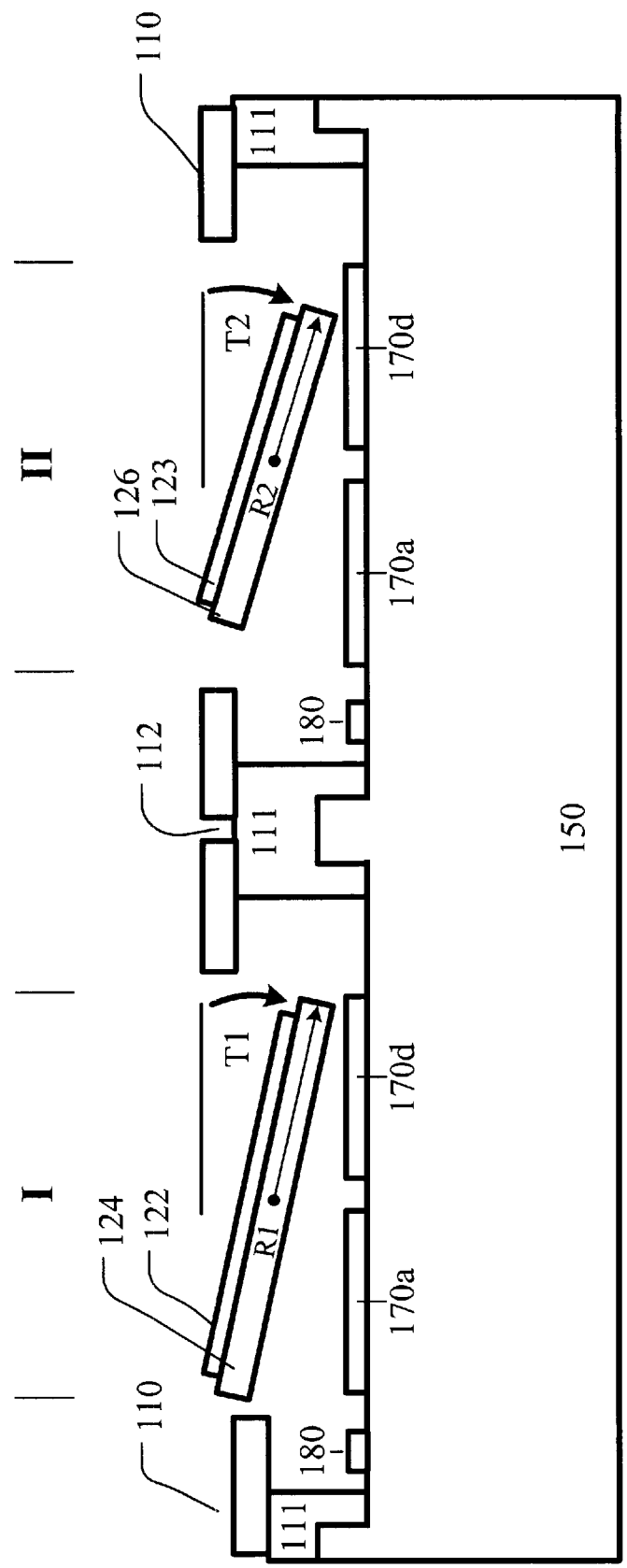
FIG. 4d shows the tilting of a MEMS mirror in FIGS. 4a and 4b.

FIG. 4c illustrates an exemplary embodiment of electrodes that may be used to control the tilt of mirrors 122 in a cut-away plan view of FIG. 4a. Similar to FIGS. 4a and 4b, FIG. 4c is merely an example of an electrode structure that can be used. For instance, the electrodes could all be shifted 45 degrees and each of the electrodes would be directly under a pivot arm of the mirror. As shown in FIG. 4c, the electrodes 170a and 170b work in combination with electrodes 170c and 170d to control the angular position of the mirror 122 about axis 126 shown in FIG. 4a. Electrodes 170d and 170a work in combination with electrodes 170c and 170b to control the angular position of the mirror 122 about axis 127 shown in FIG. 4a. Electrodes 170a–170d are respectively connected to the integrated control system 180 with wires or traces for tilt control of the mirror 122. As depicted in Section I of FIG. 4d, by appropriate control of electrodes 170a–170d collectively, the tilt angle T1 of mirror 122 may be controlled, as well as, the height (i.e. z-axis) of the mirror 122. A DC bias to all four electrodes 170a–170d can make the top surface of the mirror 122 rise slightly above or sink slightly below the top surface of the actuation substrate 110, with the direction of movement depending on the polarity of the DC biasing. As further depicted in Section II of FIG. 4d, the mirror 123 having a smaller radius R2 than the radius R1 of the mirror 122 in Section I can tilt to a larger angle T2 than the largest tilt angle T1 of mirror. The larger tilt angle T2 of mirror 123 is a result of the reduced radius R2 giving the mirror 123 more room to swing down.

Figure 5:
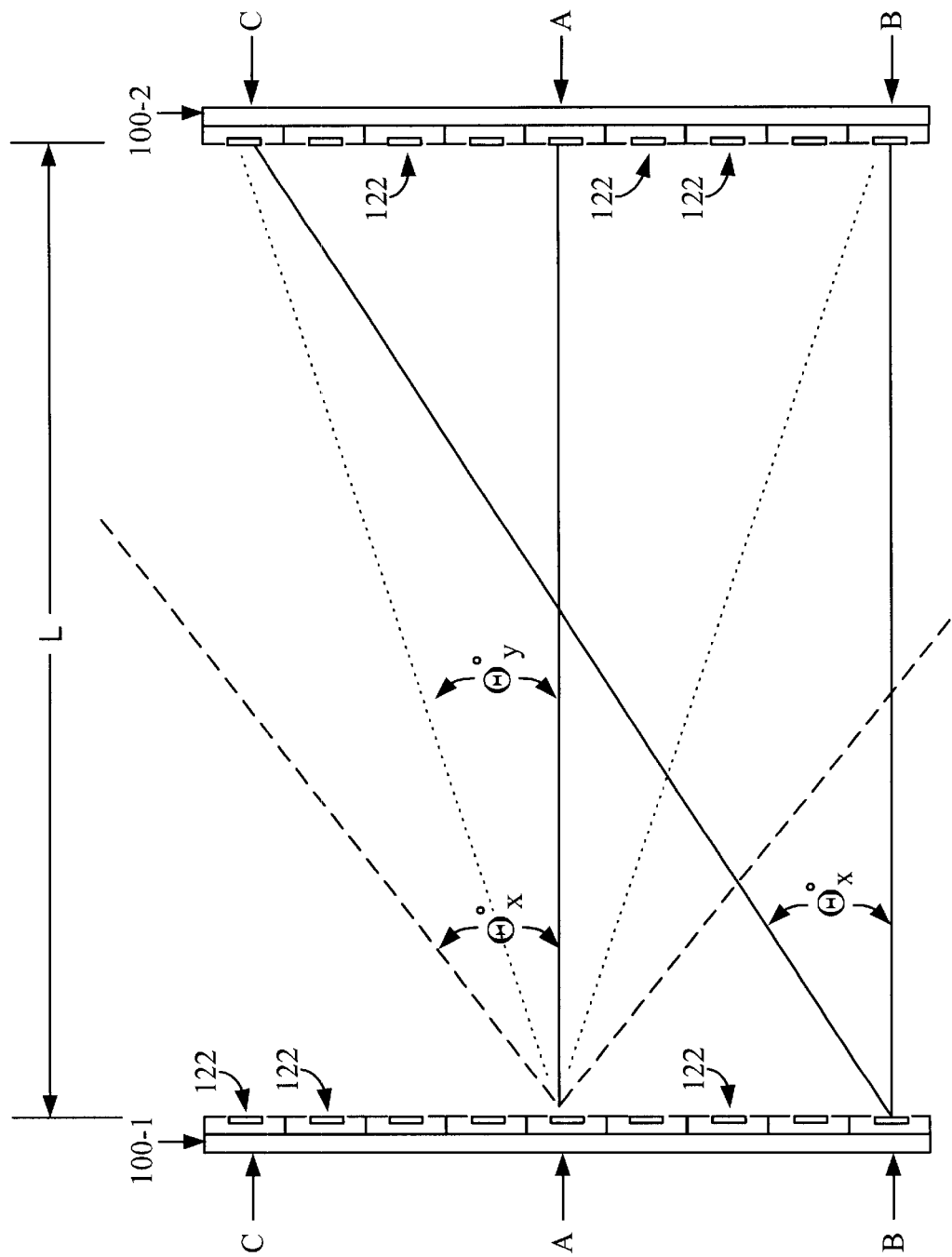
FIG. 5 illustrates the relation of the distance between two planar arrays of mirrors and the system tilt angle θ.

For explanation purposes, FIG. 5 is representational showing of how the distance between two planar micromirror arrays 100 is affected by the switching tilt angle θ of the micro-mirrors. The illustration in FIG. 5 is in terms of micro-mirrors 122 in one array 100-1 being able to interact with all the micro-mirrors 122 in the other array 100-2 to reflect light beams from an input to an output. As shown in FIG. 5, micro-mirror arrays 100 may have a micro-mirror at position A in the middle of each of the arrays 100 and a micro-mirror at positions B and C on sides of the arrays 100. Preferably, every micro-mirror on an array 100-1 can interact with every micro-mirror on the other array 100-2.

The distance L between the two arrays affects the length of the optical path through the optical switching. Assuming each micro-mirror 122 of an array 100-1 is capable of directing an input beam to any micro-mirror 122 of array 100-2, the minimum distance L that can be obtained depends upon the switching tilt angle $\theta_x$ used for the micro-mirrors in the switching process. Although the switching tilt angle $\theta_y$ allows a micro-mirror 122 at position A of array 100-1 to interact with all the micro-mirrors 122 of array 100-2, the micro-mirror at position B of array 100-1 is at a greater switching tilt angle $\theta_x$ when it interacts with the micromirror at position C of array 100-2 and thus requires a distance between the arrays of at least the distance L, as shown in FIG. 5. Specifically, the minimum distance L depends upon the switching tilt angle $\theta_x$ that a micro-mirror at position B of the first array 100-1 requires to interact with a micro-mirror at position C of the second array 100-2. In effect, the larger the switching tilt angle $\theta_x$ is at position B (or C) of the array, the required distance L between the arrays becomes smaller. In the alternative to reducing the distance L from an increased switching tilt angle $\theta_x$, the mirror arrays could be made to include more mirrors and, thus, more switching capacity. Therefore, if the mirrors at positions B and C can also operate at a reduced switching tilt angle θ closer to the switching tilt angle $\theta_y$ of the mirror at position A and all mirrors on each array can interact with one another, the distance L can be reduced, the switching capacity can be increased or both.

Figure 6:
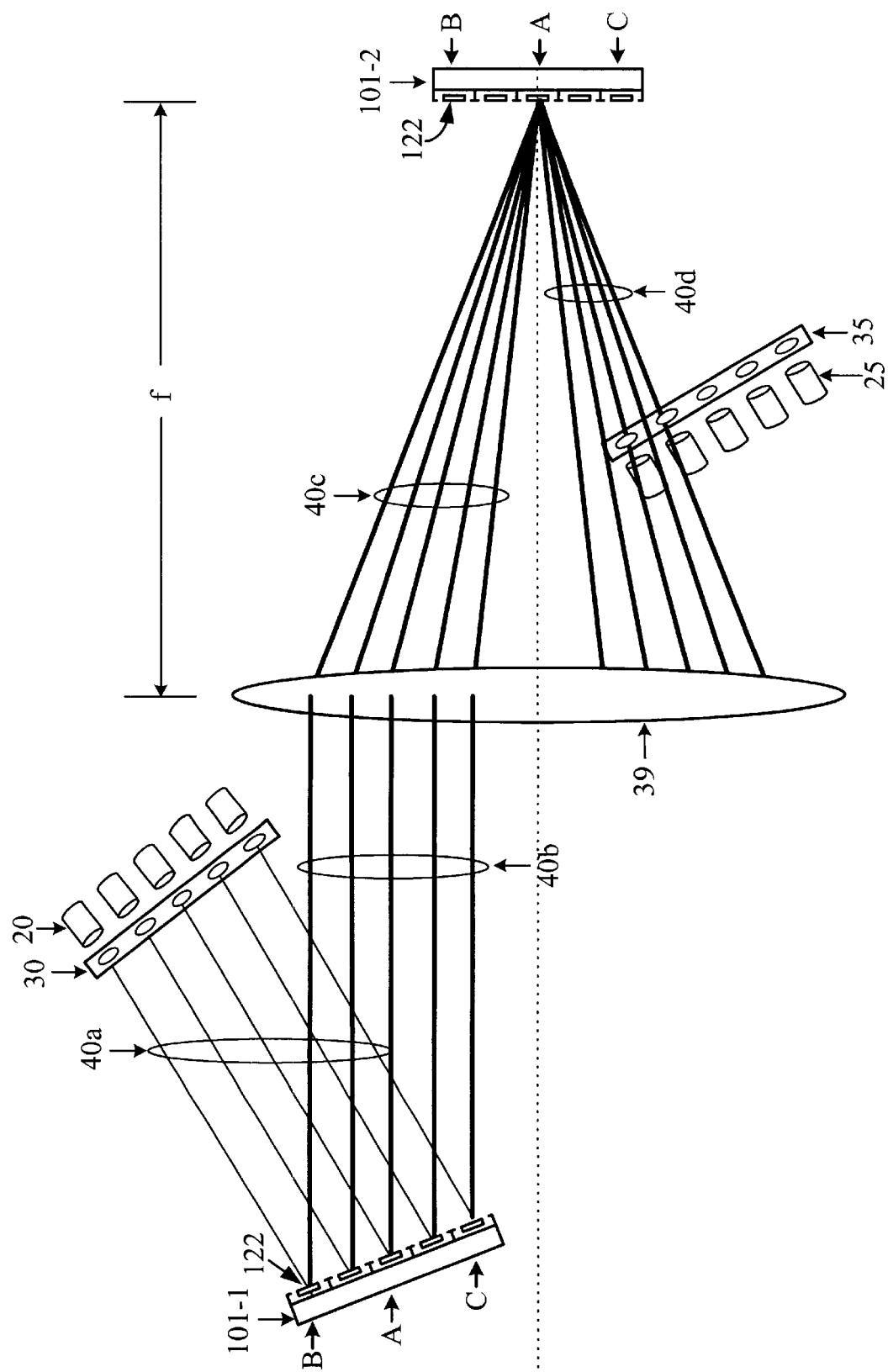
FIG. 6 illustrates a first exemplary embodiment of the invention with none of the mirrors tilted.

FIG. 6 illustrates a first exemplary embodiment of an optical switch according to the invention having input optical fibers 20 and output optical fibers 25 arranged in two-dimensional arrays. Similarly, a first lens arrangement 30 and a second lens arrangement 35 are arranged in arrays and aligned with the input optical fibers 20 and the output optical fibers 25, respectively. A first mirror array 101-1 may be positioned at an angle to lens array 30 and generally faces a second mirror array 101-2 with a distance between the two mirror arrays. The second mirror array 101-2 may be positioned at an angle to the second lens array 35. The mirror units 122 of the first mirror array 101-1 and second mirror array 101-2 are formed of microelectromechanical system (MEMS) elements. Located between the two mirror arrays 101 is a lens system 39, which has a finite focal length, as shown in FIGS. 6–9. The lens system 39 may be comprised of a single lens, a series of lenses or a combination of different types of lenses (i.e. concave, convex, spheric, aspheric). The first mirror array 101-1 may be positioned at an angle with respect to the lens system 39. The second mirror array 101-2 on the other side of the lens system may be positioned substantially along the focal plane f of the lens system 39 and is substantially perpendicular to the optical axis of the lens system 39. The lens system decreases diffraction of the light as result of gathering all the reflected light and focusing the light on the second mirror array 101-2.

As shown in FIG. 6, a centerline of the optical switch arrangement goes through a central portion of the second mirror array 101-2 and along the optical axis of the lens system 39. The first lens arrangement 30, the input optical fibers 20 and the first mirror array 101-1 are located on one side of the centerline. The second lens arrangement 35 and the output optical fibers 25 are located on the other side of the centerline. FIG. 6 further shows the initial optical paths 40a–d through the optical switch when none of the mirrors are tilted. FIG. 6 is not indicative of a switched state for the optical switch but to show how the mirrors 122 on the first mirror array all have reduced switching tilt angles. Specifically, the initial light path 40a emanates from the input optical fibers 20, through lens arrangement 30 to the first mirror array 101-1. The light 40b is reflected off the untilted mirrors 122 of the first mirror array and goes in parallel with the centerline toward the lens system 39. The lens system 39 captures all of the reflected light and redirects it towards 40c a central portion of the second mirror array 101-2. The light is reflected off the untilted mirrors 122 toward 40d the second lens arrangement 35 and output optical fibers 25.

Although FIG. 6 shows the first mirror array to be the same as the second mirror array, the mirror arrays can be different in size, number of mirrors on the arrays or configuration of the mirrors in the arrays. In any event, the respective lens arrangements and optical fibers should correspond to the number of mirrors on the arrays and the configuration of the mirrors in the arrays. FIG. 6 also shows that all of the mirrors 122 in both arrays are the same size. However, as a result of the focusing effect or redirecting of the reflected light 42b (i.e. smaller diameter signal beam), smaller mirrors, like mirror 123 discussed previously, can be used in the second mirror array that are capable of a larger tilt angle than mirrors 122 in the first mirror array 101-1.

As a result of the use of the lens system 39, as shown in FIG. 6, each mirror at positions B and C on the first mirror array will use substantially the same reduced switching tilt angle θ that is substantially equivalent to the switching tilt angle θ of the mirror at position A on the first mirror array. In other words, all of the mirrors on the array will be using substantially the same deflection (i.e. 2θ) during switching operations. For example, the mirror at position B of the first mirror array 101-1 will use substantially the same switching tilt angles θ (or full deflection) interacting with mirrors at positions B and C of the second mirror array 101-2 as a mirror at position A of the first mirror array 101-1 interacting with mirrors at position B and C of the second mirror array 101-2.

Figure 7:
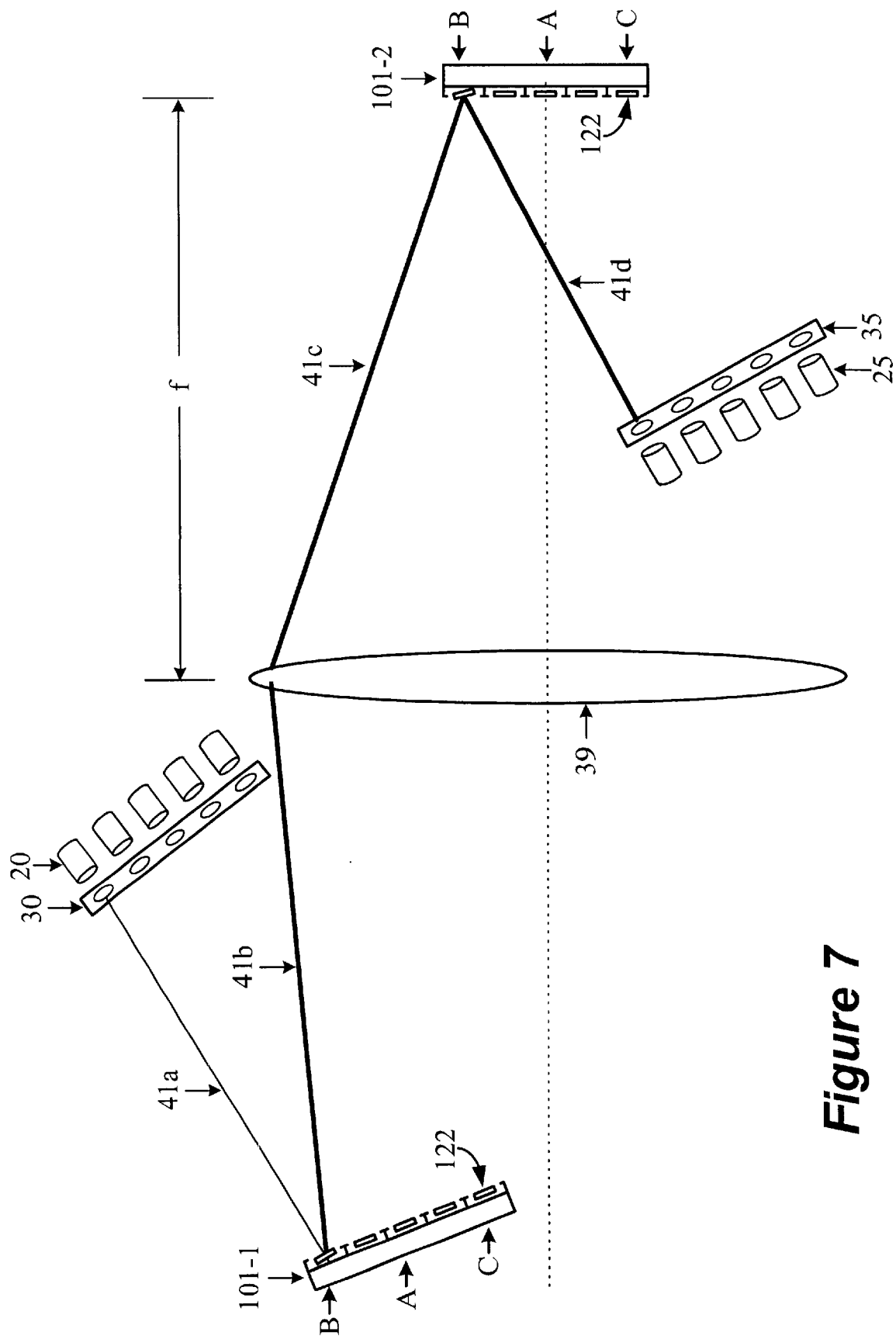
FIG. 7 illustrates the first exemplary embodiment of the invention in operation with mirrors tilted.

FIG. 7 illustrates an operational example of the first exemplary embodiment of the present invention.

Specifically, the initial signal path 41a emanates from the top input fiber of the input optical fibers 20, through lens arrangement 30 to the mirror at position B on the first mirror array 101-1. The signal is reflected off the mirror at position B that is tilted up and goes toward 41b the lens system 39. The lens system 39 captures all of the reflected signal and redirects the signal at the second mirror array 101-2 consistent with the focal plane of the lens system with respect to the incident angle (i.e. angle with respect to the optical axis of the lens system) of the reflected signal to the lens system 39. In this instance, the signal 41c is directed toward the mirror at position B on the second mirror array 101-2 as a result of the appropriate tilting of the mirror at position B of the first array 101-1. The signal 41d is reflected off the mirror tilted down at position B on the second mirror array 101-2 toward the top lens of the second lens arrangement 35 and output optical fibers 25. Of course, any mirror on the first mirror array 101-1 can interact with any other mirror on the second mirror array 101-2. Therefore, a signal in any one of the input fibers 20 can be switched to any one of the output fibers 25.

FIGS. 6 and 7 are illustrative of an asymmetric embodiment of the invention in that the switching signal path passes through the lens system 39 only once. In order to prevent problems as a result of lens aberrations in the lens system and to maintain the wavefront of the signal, the signal beam may be reflected in and out through the lens system twice with the reflection point being along the focal plane of the lens system. This requires a third mirror array located on the same side of the lens system as the first mirror array. The addition of a third mirror array can further reduce the switching tilt angle θ used in a mirror array because a mirror on the intermediate second mirror array can be chosen in between the interacting mirrors of the first and third mirror that reduces the required switching tilt angle θ for all of the mirror arrays. Such a reduction means that larger arrays can be used.

Figure 8:
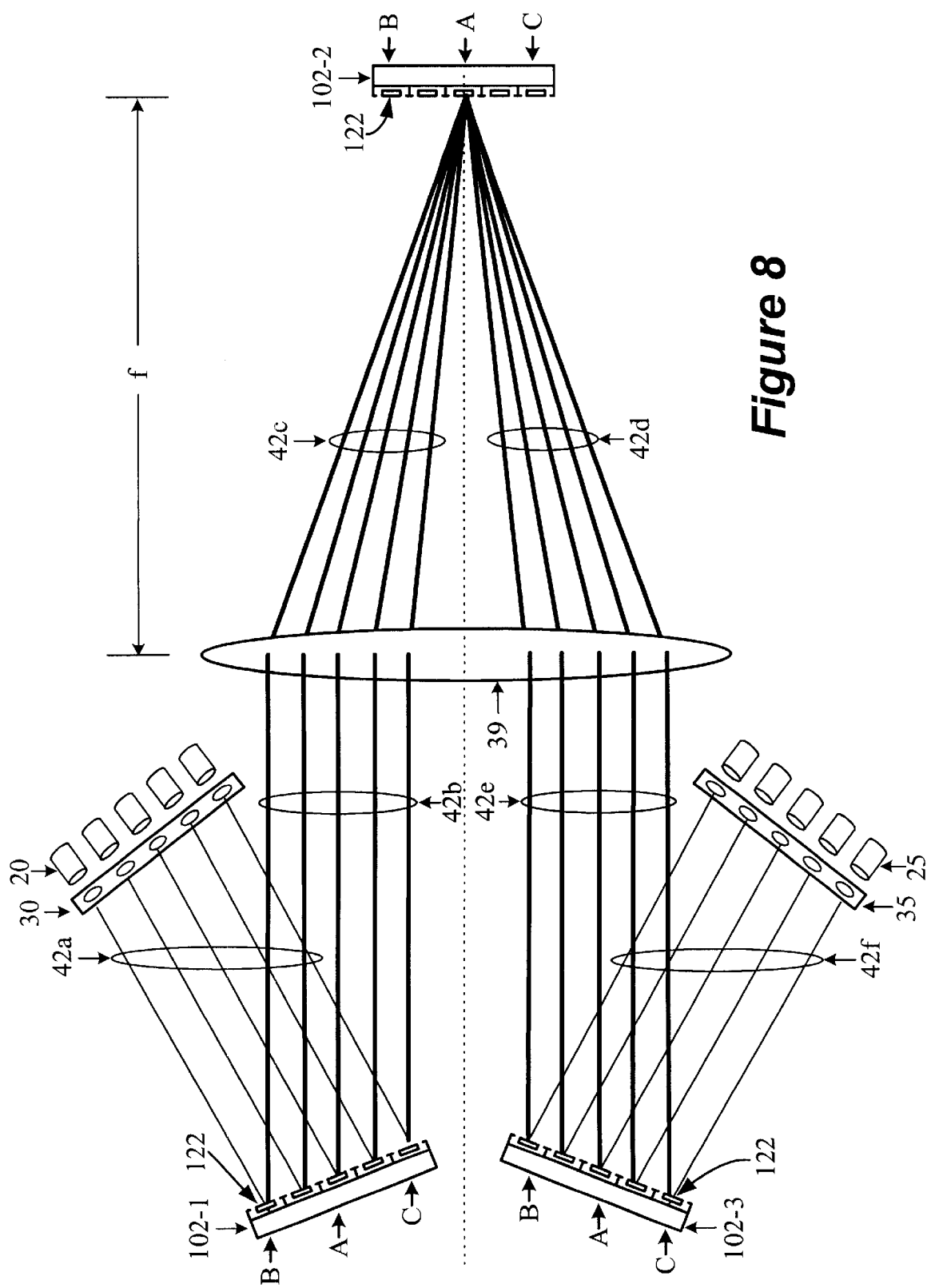
FIG. 8 illustrates a second exemplary embodiment of the invention with none of the mirrors tilted.

FIG. 8 illustrates a second exemplary embodiment of the invention in that an optical switch has input optical fibers 20 and the output optical fibers 25 arranged in two-dimensional arrays. Similarly, a first lens arrangement 30 and a second lens arrangement 35 are arranged in arrays and aligned with the input optical fibers 20 and the output optical fibers 25, respectively. A first mirror array 102-1 may be positioned at an angle to lens array 30 and generally faces a second mirror array 102-2 with a distance between the two mirror arrays. A third mirror array 102-3 may be positioned at an angle to the second lens array 35 and generally faces a second mirror array 102-2 with a distance between the two mirror arrays. The mirror units 122 of the first mirror array 102-1, second mirror array 102-2 and third mirror array 102-3 are formed of microelectromechanical system (MEMS) elements. Located between the first and second mirror arrays, and the third and second mirror arrays is a lens system 39. As stated previously, the lens system 39 may be comprised of a single lens, a series of lenses or a combination of different types of lenses (i.e. concave, convex, spheric, aspheric). The first mirror array 102-1 may be positioned at an angle with respect to the lens system 39 on one side of the lens system. The third mirror array 102-3 may be positioned at an angle with respect to the lens system 39 on the same side of the lens system as the first mirror array 102-1. The second mirror array 102-2 on the other side of the lens system is positioned on the focal plane f of lens system 39 and is substantially perpendicular to the optical axis of the lens system 39. The lens system decreases optical losses due to diffraction of the light as result of gathering all the reflected light from both the first mirror array 102-1 and the second mirror array 102-2.

As shown in FIG. 8, a centerline of the arrangement goes through a central portion of the second mirror array 102-2 and along the optical axis of the lens system 39. The first lens arrangement 30, the input optical fibers 20 and the first mirror array 102-1 are located on one side of the centerline. The second lens arrangement 35, the output optical fibers 25 and the third mirror array 102-3 are located on the other side of the centerline. FIG. 8 further shows the initial optical paths 42a–f through the optical switch when none of the mirrors are tilted. FIG. 8 is not indicative of a switched state for the optical switch but rather is indicative of the reduction in switching tilt angle requirements for the mirrors 122. Specifically, the initial light path 42a emanates from the input optical fibers 20, through lens arrangement 30 to the first mirror array 102-1. The light is reflected off the untilted mirrors 122 of the first mirror array 102-1. The reflected light 42b of the first mirror array goes in parallel with the centerline toward the lens system 39. The lens system 39 captures all of the reflected light and redirects the light 42c towards a central portion of the second mirror array 102-2. The light is reflected off the untilted mirrors 122 back toward 42d the lens system 39. The lens system 39 collimates the light back into a path parallel with the centerline toward 42e the third mirror array 102-3. The collimated light is reflected off the untilted mirrors 122 of the third mirror array 102-3 toward 42f the second lens arrangement 35 and output optical fibers 25.

Although FIG. 8 shows the first mirror array 102-1 to be the same as the third mirror array 102-3, the mirror arrays can be different in size, number of mirrors on the arrays or configuration of the mirrors in the arrays. In any event, the lens arrangements and optical fibers should correspond to the number of mirrors on the arrays and the configuration of the mirrors for the respective arrays that are respectively aligned with the lens arrangements and optical fibers arrangements. In addition, the second mirror array 102-2 can likewise be different but preferably should have at least the same number of mirrors as the third mirror array 102-3 to facilitate an output to all output optical fibers.

FIG. 8 also show that all of the mirrors 122 in all three of the mirror arrays are the same size. However, as a result of the focusing effect to the signal path 42c after going through the lens system (i.e. the signal beam has a smaller diameter), smaller mirrors, like mirror 123 discussed previously, can be used in the second mirror array that are capable of a larger tilt angle than mirrors 122 in the first mirror array 102-1 and the third mirror array 102-3. Therefore, the second mirror array may be smaller in size, and still enable the switching of signal paths from the first mirror array to the third mirror array.

As a result of the use of the lens system 39, as shown in FIG. 8, each mirror at positions B and C on the first mirror array 102-1 will use substantially the same reduced switching tilt angle θ that is substantially equivalent to the switching tilt angle θ of the mirror at position A on the first mirror array 102-1. In other words, all of the mirrors on the first mirror array 102-1 will be using substantially the same deflection (i.e., 20) during switching operations. In addition, each mirror at positions B and C on the third mirror array 102-3 will make use of substantially the same reduced switching tilt angle θ that is substantially equivalent to the switching tilt angle θ of the mirror at position A on the third mirror array 102-3 or all of the mirrors on the third mirror array will be using substantially the same full deflection when receiving the signal 42e back through the lens system 39 from the second mirror array 102-2. For example, the mirror at position B of the third mirror array 102-3 will use substantially the same switching tilt angles θ (or full deflection) interacting with mirrors at positions B and C of the second mirror array 102-2 as a mirror at position A of the third mirror array 102-3 interacting with mirrors at position B and C of the second mirror array 102-2.

Figure 9:
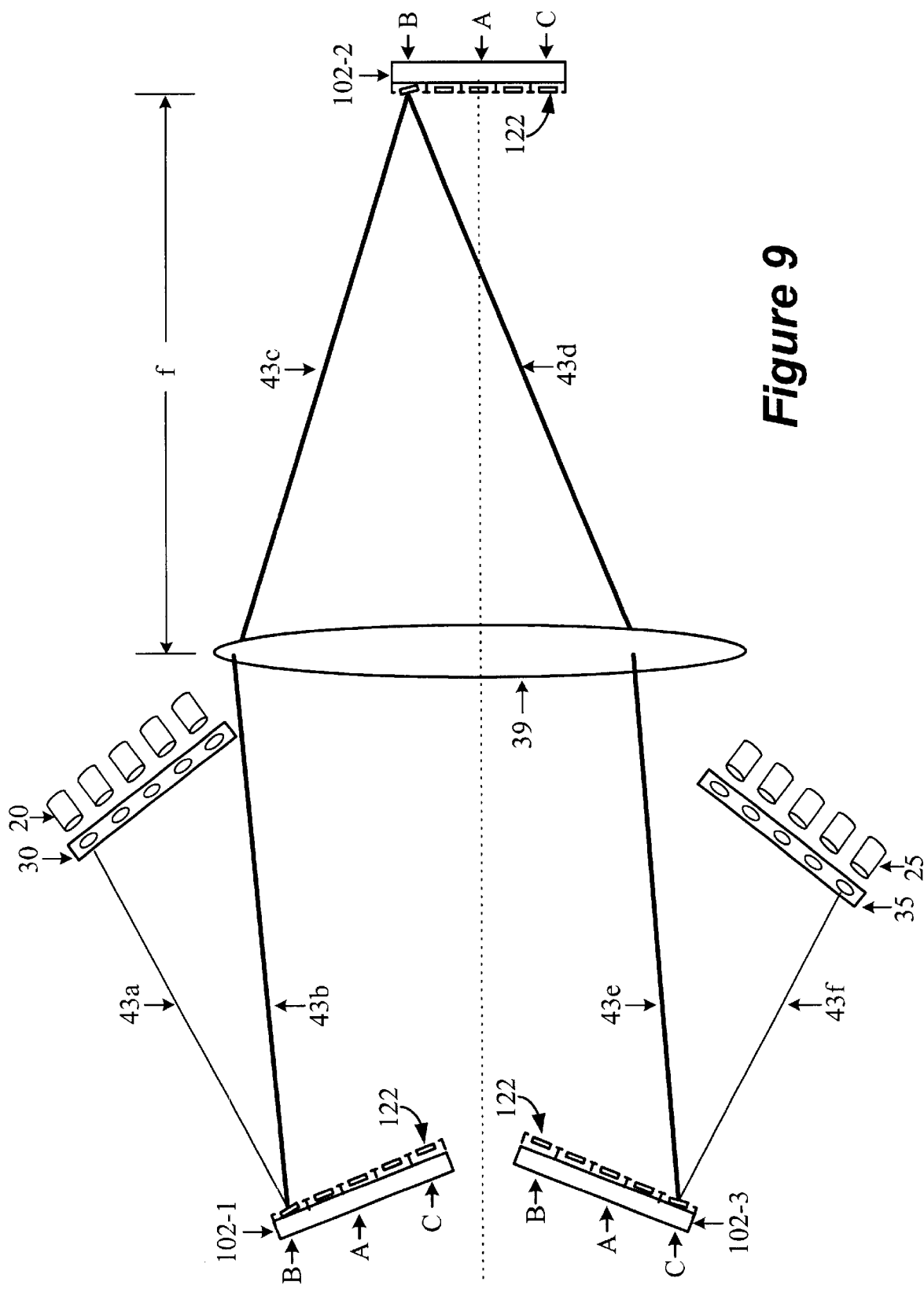
FIG. 9 illustrates the second exemplary embodiment of the invention in operation with mirrors tilted.

FIG. 9 illustrates an operational example of the second exemplary embodiment of the present invention. Specifically, the initial light path 43*a* of the signal emanates from the top input fiber of the input optical fibers 20, through lens arrangement 30 to the mirror at position B on the first mirror array 102-1. The signal is reflected off the mirror at position B that is tilted up. The reflected signal 43*b* goes toward the lens system 39. The lens system 39 captures all of the reflected signal and redirects the signal toward the second mirror array 102-2 consistent with the focal plane of the lens system with respect to the incident angle (i.e. the angle with respect to the optical axis of the lens system) of the reflected signal to the lens system 39. In this instance, the signal path 43*c* is directed toward the mirror at position B on the second mirror array 102-2 as a result of the appropriate tilting of the mirror at position B of the first array 102-1 and the refraction of the lens system 39. The signal is reflected off the mirror tilted down at position B on the second mirror array 102-2 back toward 43*d* the lens system 39. In this instance, the signal 43*e* is directed toward the mirror at position C on the third mirror array 102-3 as a result of the appropriate tilting of the mirror at position B of the second array 102-2 and the refraction of the lens system 39. The signal 43*f* is reflected off the mirror tilted up at position C on the third mirror array 102-3 toward the bottom lens of the second lens arrangement 35 and output optical fibers 25. Of course, any mirror on the first mirror array 102-1 can interact with any other mirror on the second mirror array 102-2. Any mirror on the second array 101-2 can interact with any other mirror on the third mirror array 102-3. Therefore, a signal in any one of the input fibers 20 can be switched to any one of the output fibers 25.

It will be apparent to those skilled in the art that various modifications and variations can be made in the optical switch of the present invention without departing from the spirit or scope of the invention. Thus, it is intended that the present invention covers the modifications and variations of this invention provided they come within the scope of the appended claims and their equivalents.

What is claimed is:

1. An optical switch comprising:

a lens system having a first side and a second side, wherein the lens system has a finite focal length;

a first mirror array positioned on the first side of the lens system;

a second mirror array positioned on the second side of the lens system along a focal plane of the lens system and substantially perpendicular to an optical axis of the lens system; and a third mirror array positioned on the first side of the lens, wherein the first and third mirror arrays are positioned off the axis.

2. The optical switch according to claim 1, wherein the optical inputs aligned with the first mirror array are positioned on the first side of the lens system and optical outputs aligned with the third mirror array are also positioned on the first side of the lens system.

* * * * *